United States Patent Office 2,709,335
Patented May 31, 1955

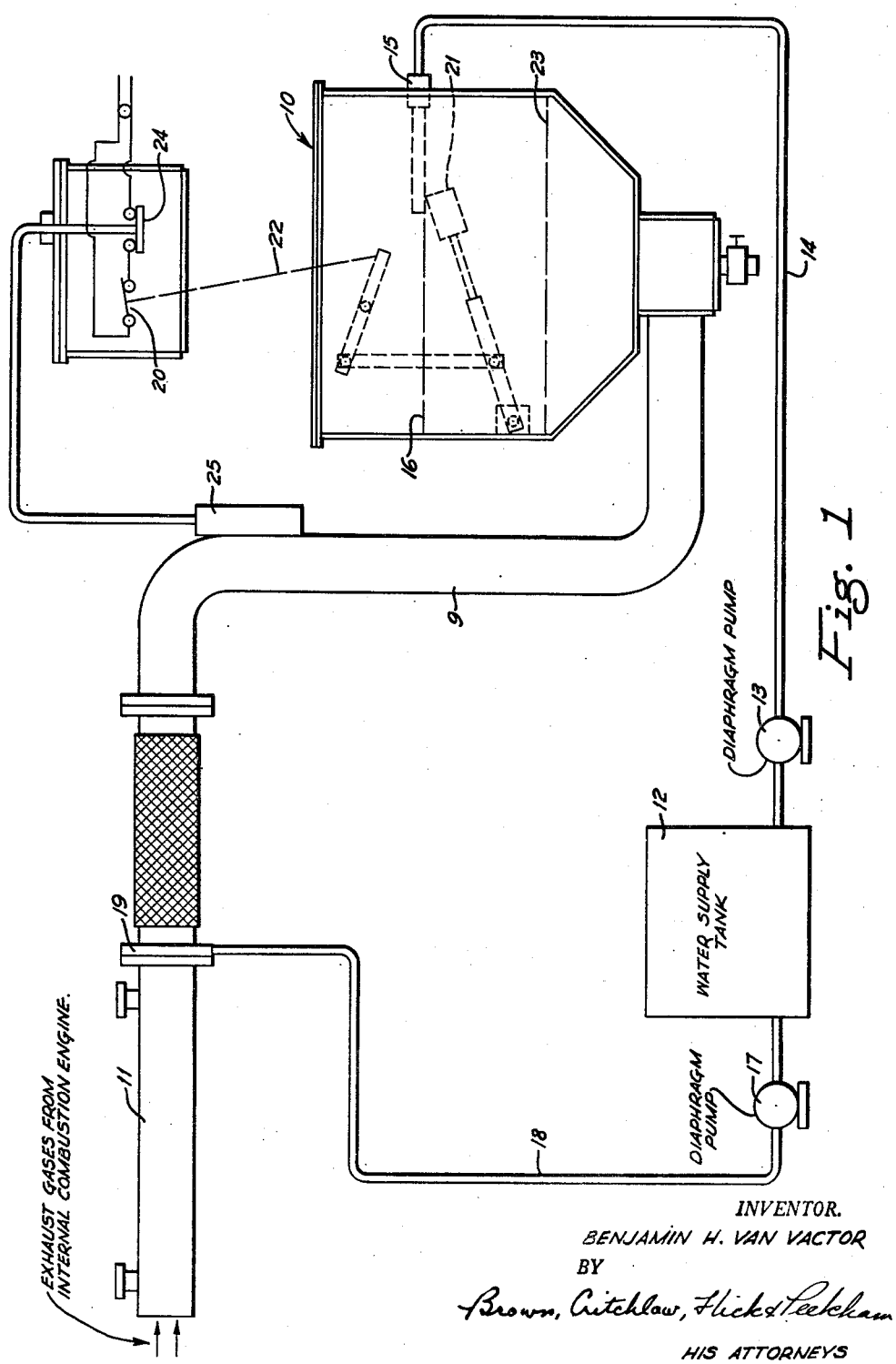

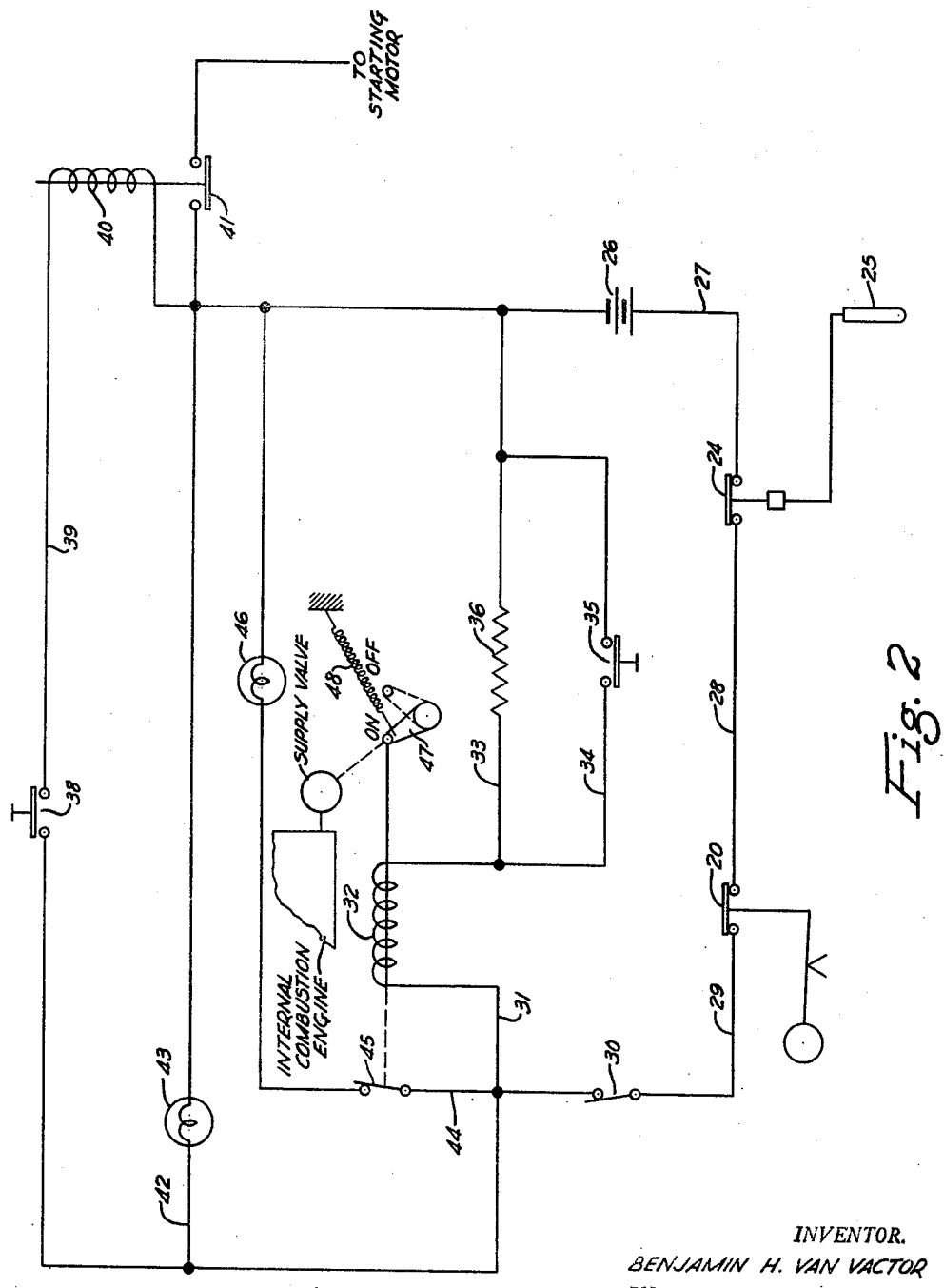

2,709,335

SAFETY EXHAUST SYSTEM

Benjamin H. Van Vactor, Beckley, W. Va., assignor to National Mine Service Company, a corporation of West Virginia Application October 22, 1953, Serial No. 387,685

8 Claims. (Cl. 60—30)

The present invention relates to an electrically operated system for use in connection with the exhaust of diesel or other internal combustion engines.

The invention is particularly useful for diesel engines when used in mines and similar confined locations where the exhaust must be treated in a special exhaust conditioner before it can be safely discharged into the confined space. The system of the present invention provides electrical means so arranged that the engine cannot be operated unless the exhaust gas conditioner is in satisfactory operating condition, and the surface temperatures of the exhaust piping are safe.

A particular feature of the invention is an arrangement of means whereby the engine cannot be started unless the said temperature and the level in the exhaust gas conditioner are satisfactory.

Another object of the invention is to provide a system in which the operation of the engine is automatically stopped at anytime either the said temperature or water conditions are not satisfactory.

These and other objects and advantages of the invention will become clear as the description proceeds.

In the drawings:

Fig. 1 is a diagram illustrating the main parts of the safety exhaust system.

Fig. 2 is a diagram illustrating the electrical connections of the system.

Referring to the drawings in greater detail, the numeral 10 indicates an exhaust gas conditioner. Since the details of this conditioner form no part of the present invention, they will be referred to only in a general way. This exhaust gas conditioner receives the exhaust gas from the diesel engine by way of water-jacketed exhaust manifold 11, cools it to 160° F. or less, removes noxious odors and deleterious substances that may be contained in the gas, and eliminates the possibility of sparks issuing from the exhaust conditioner. While performing these functions all exterior surfaces of the conditioner are maintained below a temperature of 400° F. The treated gases are discharged from the exhaust gas conditioner.

The above-named functions cannot be performed in the exhaust gas conditioner unless a certain water level is maintained in the sump of the exhaust gas conditioner 10. Water is supplied from the water supply tank 12 by a diaphragm pump 13, which pumps water from the tank 12 and supplies it through pipe 14 to the inlet valve 15. The inlet valve 15 is a float valve which shuts off the water supply to the conditioner 10 when the water reaches the normal water level 16.

A second diaphragm pump 17 pumps water from the supply tank 12 through pipe 18 to a jet ring 19 located adjacent to the exhaust manifold 11. This jet ring directs a plurality of jets of cooling water into the exhaust stream as it leaves the manifold.

The diaphragm pumps 13 and 17 are driven by the diesel engine, and hence their speed of operation is proportional to the speed of the engine. These pumps have a straight line displacement over the entire range of engine speed, which means that they deliver water in proportion to engine speed.

The float valve 15 is so designed that when water reaches the normal water level 16 the valve closes and prevents further inlet of water. After valve 15 cuts off the diaphragm pump 13 continues to operate but it ceases to deliver water, hence no relief valve is needed in pipe line 14.

Due to the desirable characteristics described above, the diaphragm pump is particularly adapted for use in the system of the present invention.

For safe operation of the diesel engine, it is essential that a certain minimum level of water be maintained in the exhaust gas conditioner. The system includes means which prevents operation of the engine when the water drops to the minimum level. This means includes a float-controlled switch 20, and a float 21. The float 21 is connected to the switch 20 by mechanical linkage 22 which holds the switch 20 closed when the water is above the minimum level 23, but opens the switch when the water drops to level 23, thus preventing operation of the engine.

It is also important that the engine be prevented from operating when any part of the exhaust system rises above the maximum safe temperature of 400° F. The exhaust manifold 11 is water-jacketed and, therefore, is at the same temperature as the engine cooling water.

The surface temperature of the exhaust pipe 9, which carries the exhaust from the manifold 11 to the exhaust gas conditioner 10, is maintained below 400° F. by the injection of cooling water into the exhaust stream through the jet ring 19.

Means is provided to prevent operation of the engine in the event the exhaust pipe 9 should become too hot for any reason such as depletion of the water supply in tank 12. This means includes a thermal switch 24 which is under control of a thermal element 25 placed in contact with the exhaust pipe 9 somewhere between the manifold 11 and the exhaust gas conditioner 10. The thermal switch 24 is held closed at safe operating temperatures, but is opened when the temperature of the exhaust pipe 9 approaches the maximum safe temperature of 400° F.

The float-controlled switch 20 and the thermal switch 24 are connected in series in a circuit which leads to a solenoid for controlling a supply valve, as shown in detail in Fig. 2. This supply valve controls the supply of either fuel or air to the engine.

As shown in Fig. 2, current from battery 26 passes through conductor 27 to thermal switch 24; through conductor 28 to float switch 20; through conductor 29 to main switch 30; through conductor 31 to fuel solenoid 32; and thence back to the battery by either conductor 33 or conductor 34.

The switch 35 in conductor 34 must be closed before the solenoid can move the lever to the "on" position. When switch 35 is closed, a relatively heavy current, such as 10 amps., passes through the solenoid 32 and moves it to the "on" position. Once the solenoid has reached this position, a much lighter current can hold it in this position. Hence the switch 35 need be closed only long enough to move the solenoid 32 to the "on" position. Switch 35 is then permitted to open, and a relatively weak current, say ½ amp., passing through the resistance 36 in conductor 33 is ample to hold the solenoid in the "on" position while the engine is running.

Current from the main switch 30 is carried by conductor 37 to the starting switch 38, and thence by conductor 39 to the starting solenoid 40, which controls a switch 41 which controls flow of current to the starting motor.

A conductor 42 carries current to a main pilot light 43, which becomes illuminated when the thermal switch 24, float switch 20, and main switch 30 are all closed, thus showing that the system is in proper condition for operation.

A conductor 44 carries current from line 31 through switch 45 and pilot light 46. The switch 45 is closed by the solenoid 32 when in the "on" position, and hence the pilot light 46 becomes illuminated when the lever 47 is in the "on" position.

The lever 47 is normally biased to closed or "off" position, as by a spring 48, and is moved to the "on" position by the solenoid 32.

*Operation*

The system operates in the following manner:

A. The operator first closes the main switch 30. If the thermal switch 24 and the float switch 20 are both closed, current now passes through the main switch pilot light 43, indicating that the system is ready for operation so far as temperature and water level are concerned. The circuit which comprises the main switch 30, the thermal switch 24 and the float switch 20 may be called the "main safety circuit," since the engine will not operate unless all of these switches are closed.

B. If the main-switch pilot light 43 lights up, indicating that the "main safety circuit" is closed, the operator next closes the manual switch 35, which causes current to move the solenoid 32 to the "on" position. Current now flows through the pilot light 46, giving a visual indication that the lever 47 is in the "on" position.

C. The operator now presses the manual starting switch 38, which causes current to flow through the starting solenoid 40, which closes the starting switch 41, which permits current to pass to the starting motor.

If at any time the water in the exhaust gas conditioner drops to the minimum safe water level 23, float switch 20 is opened, thus breaking the circuit through the solenoid 32, and permitting spring 48 to move the lever to "off" position.

If at any time the temperature of exhaust pipe 9 rises above the temperature for which the thermal element 25 is set, the thermal switch 24 is opened, thus breaking the circuit through the solenoid 32, and permitting spring 48 to move the lever 47 to "off" position.

It will be clear from the above that the invention provides electrical means so arranged that the engine cannot be started or continued in operation unless both the temperature and water conditions are satisfactory.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a safety system for internal combustion engines of the type having an exhaust gas conditioner, in which a certain safe level of fluid must be maintained for proper operation of the exhaust gas conditioner, the system also having a control device with "off" and "on" positions and which controls the supply of an operating fluid to the engine, and means constantly biasing the control device toward "off" position the improvement which comprises: electrically-operated means for holding the control device in "on" position, after it has been moved to "on" position, and a main safety circuit for controlling the electrically-operated means, said main safety circuit comprising a manual switch, a switch responsive to the temperature of a part of the exhaust system, and a switch responsive to the water level in the exhaust gas conditioner.

2. A device as specified in claim 1, in which the electrically-operated means is a solenoid.

3. In a safety system for internal combustion engines of the type having an exhaust gas conditioner, in which a certain safe level of fluid must be maintained for proper operation of the exhaust gas conditioner, the system also having a control device with "off" and "on" positions and which controls the supply of an operating fluid to the engine, and means constantly biasing the control device toward "off" position, the improvement which comprises: electrically-operated means for holding the control device in "on" position, after it has been moved to "on" position, a main safety circuit which conditions the electrically-operated means for operation, the main safety circuit comprising a manual switch, a switch responsive to the temperature of a part of the exhaust system, and a switch responsive to the water level in the exhaust gas conditioner, and an actuating circuit for energizing the electrically-operated means, said actuating circuit being in series with the main safety circuit, the actuating circuit comprising a manually-operated switch.

4. A device as specified in claim 3 in which a circuit which includes a resistance is wired in parallel with the last-named manually-operated switch.

5. In a safety system for internal combustion engines of the type having a starting motor, and an exhaust gas conditioner in which a certain safe level of fluid must be maintained for proper operation of the exhaust gas conditioner, the system also having a fuel control device which controls the supply of fuel to the engine, and means constantly biasing the fuel control device toward "off" position, the improvement which comprises: a main safety circuit which comprises a manual switch, a switch which is closed if the temperature of the exhaust system is at a safe temperature, and a switch which is closed if the water in the exhaust gas conditioner is at a safe level, a manual fuel switch which is operable to turn on the fuel supply to the engine provided all of the switches of the main safety circuit are closed, and a manual starting switch which is operable to cause flow of current to the starting motor provided all of the switches of the main safety circuit are closed.

6. A device as specified in claim 5 in which a main pilot light is wired in series with the main safety circuit.

7. A device as specified in claim 5 in which a pilot light is wired to become illuminated when the control device is in the "on" position.

8. In a safety system for internal combustion engines of the type having a starting motor and an exhaust gas conditioner in which a certain safe level of fluid must be maintained for proper operation of the exhaust gas conditioner, the system also having a fuel control device which controls the supply of fuel to the engine, and means constantly biasing the fuel control device toward "off" position, the improvement which comprises: a main safety circuit which comprises a manual switch, a switch which is closed if the temperature of the exhaust system is at a safe temperature, and a switch which is closed if the water in the exhaust gas conditioner is at a safe level, a manual fuel switch which is operable to move the fuel control device to "on" position provided all of the switches of the main safety circuit are closed, a holding circuit comprising a resistor, said holding circuit being wired in parallel with the manual fuel switch and being adapted to hold the fuel control device in "on" position, and a manual starting switch which is operable to cause flow of current to the starting motor provided all of the switches of the main safety circuit are closed.

References Cited in the file of this patent

UNITED STATES PATENTS 2,687,008    Van Vactor   _____ Aug. 24, 1954